(12) United States Patent
Nakatani

(10) Patent No.: US 8,915,476 B2
(45) Date of Patent: Dec. 23, 2014

(54) LEG DEVICE

(75) Inventor: Koichiro Nakatani, Tokyo (JP)

(73) Assignee: Velbon Kabushiki Kaisha, Tokyo (JP)

( * ) Notice: Subject to any disclaimer, the term of this patent is extended or adjusted under 35 U.S.C. 154(b) by 81 days.

(21) Appl. No.: 13/375,651

(22) PCT Filed: Jun. 1, 2009

(86) PCT No.: PCT/JP2009/059973
§ 371 (c)(1),
(2), (4) Date: Dec. 1, 2011

(87) PCT Pub. No.: WO2010/140203
PCT Pub. Date: Dec. 9, 2010

(65) Prior Publication Data
US 2012/0074290 A1    Mar. 29, 2012

(51) Int. Cl.
*F16M 11/02* (2006.01)

(52) U.S. Cl.
USPC ............... 248/177.1; 248/163.1; 248/166; 248/171

(58) Field of Classification Search
USPC .......... 248/163.1, 164, 166, 463, 431, 464, 248/177.1, 168, 170, 408, 407, 411, 412, 248/404, 171
See application file for complete search history.

(56) References Cited

U.S. PATENT DOCUMENTS

| | | | | |
|---|---|---|---|---|
| 1,844,113 A | * | 2/1932 | Beidler et al. | 403/300 |
| 4,648,697 A | * | 3/1987 | Kawazoe | 248/163.1 |
| 4,648,698 A | * | 3/1987 | Iwasaki | 248/163.1 |
| 5,708,890 A | * | 1/1998 | Nakano | 396/428 |
| 5,772,164 A | * | 6/1998 | Shen | 248/170 |
| 6,179,321 B1 | * | 1/2001 | Sun | 280/658 |
| 6,254,044 B1 | * | 7/2001 | Lee | 248/177.1 |
| 7,341,164 B2 | * | 3/2008 | Barquist et al. | 220/629 |
| 2009/0072100 A1 | * | 3/2009 | Zierer et al. | 248/169 |
| 2009/0095856 A1 | * | 4/2009 | Nakatani | 248/177.1 |

FOREIGN PATENT DOCUMENTS

| | | |
|---|---|---|
| CN | 1441887 A | 9/2003 |
| JP | 50-129124 U | 10/1975 |
| JP | 10-304805 A | 11/1998 |
| JP | 2003-97791 A | 4/2003 |
| JP | 2006-81282 A | 3/2006 |
| JP | 2008-232214 A | 10/2008 |

OTHER PUBLICATIONS

Chinese Office Action issued in Chinese Patent Application No. 200980159205.1 dated Sep. 5, 2013.

* cited by examiner

*Primary Examiner* — Amy J Sterling
(74) *Attorney, Agent, or Firm* — McDermott Will & Emery LLP

(57) ABSTRACT

A leg device that is capable of simultaneously releasing three extendible/contractible legs from a locked state with a single action is provided. A tripod, which is a leg device, has a base. A tripod head is attached to a tripod head attaching portion of the base. A middle extendible/contractible leg, a one-side extendible/contractible leg, and an opposite-side extendible/contractible kg are pivotally attached to a leg attaching portion of the base. Gripping all the three extendible/contractible legs, i.e. the middle extendible/contractible leg, the one-side extendible/contractible leg, and the opposite-side extendible/contractible kg, together causes the middle extendible/contractible leg, the one-side extendible/contractible leg, and the opposite-side extendible/contractible leg to simultaneously shift from a locked state to an unlocked state.

1 Claim, 7 Drawing Sheets ized in Japanese on Dec. 9, 2010 as
LEG DEVICE

CROSS REFERENCE TO PRIOR APPLICATIONS

This application is a. U.S. National Phase application under 35 U.S.C. §371 of International Application No. PCT/JP2009/059973, filed on Jun. 1, 2009. The international Application was published in Japanese on Dec. 9, 2010 as WO 2010/140203 A1 under PCT Article 21(2). All of these applications are herein incorporated by reference.

TECHNICAL FIELD

The present invention relates to a leg device that includes at least three extendible/contractible legs.

BACKGROUND

Examples of known conventional leg devices include a tripod described in Japanese Laid-open Patent Publication No. 2008-232214 (FIGS. 4, 7, etc.) ("JP '214").

The conventional lea device disclosed in JP '214 includes a tripod head for supporting an object to be supported, such as a camera; a base to which the tripod head is rotatably attached; and three extendible/contractible legs that are provided at the base. When in a locked state, the legs are prevented from being extended or contracted, and when in an unlocked state, they can be extended or contracted. Each leg includes a first pipe-shaped body, a second pipe-shaped body movably inserted in the first pipe-shaped body, a third pipe-shaped body movably inserted in the second pipe-shaped body, a first restriction element (the upper-side restriction element) for restricting movement of the second pipe-shaped body with respect to the first pipe-shaped body, a second restriction element (the lower-side restriction element) for restricting movement of the third pipe-shaped body with respect to the second pipe-shaped body, and an operation lever for moving the first restriction element.

In the conventional leg device described above, when, for example, contracting the three legs that are in the extended state, it is necessary to move the first restriction element of each leg by each respective operation lever thereof, and it is therefore necessary to individually release each leg from the locked state.

In order to solve the above problem, an object of the invention is to provide a leg device that is capable of simultaneously releasing at least three extendible/contractible legs from the locked state with a single action.

SUMMARY OF THE INVENTION

A leg device according to an example of the invention includes a base and at least three extendible/contractible legs that are provided at the base in such a manner as to be capable of being extended and contracted, wherein gripping all of the at least three extendible/contractible legs together causes the at least three extendible/contractible legs to simultaneously shift from a locked state to an unlocked state.

According to another example, each one of the at least three extendible/contractible legs includes a first pipe-shaped body having a female engagement portion; a second pipe-shaped body movably inserted in the first pipe-shaped body; a restriction element that is provided so that, when the extendible/contractible leg is in the locked state, engagement of the restriction element with the female engagement portion prevents movement, of the second pipe shaped body with respect to the first pipe-shaped body and that, when the extendible/contractible leg is in the unlocked state, the restriction element does not engage the female engagement portion, thereby enabling movement of the second pipe-shaped body with respect to the first pipe-shaped body; and a biasing element for applying a biasing force to the restriction element, wherein gripping all of the at least three extendible/contractible legs together causes the restriction elements of the at least three extendible/contractible legs to simultaneously overcome the biasing force of the biasing elements and move from a position where the restriction elements are capable of engaging with the female engagement portions to a position where the restriction elements do not engage with the female engagement portions.

According to a further example, the at least three extendible/contractible legs are composed of a middle extendible/contractible leg, a one extendible/contractible leg, and an opposite-side extendible/contractible leg, which are respectively provided with unlocking elements attached to the respective first pipe-shaped bodies; the unlocking element of the one-side extendible/contractible leg is provided, at the side facing away from the middle extendible/contractible leg, with an elastically deformable operation portion that is adapted to be pushed for operation by a user and thereby elastically deformed so as to move the restriction element of the one-side extendible/contractible leg; the unlocking element of the opposite-side extendible/contractible leg is provided, at the side facing away from the middle extendible/contractible leg, with an elastically deformable operation portion that is adapted to be pushed for operation by the user and thereby elastically deformed so as to move the restriction element of the opposite-side extendible/contractible leg; and the unlocking element of the middle extendible/contractible lea is provided, at the side adjacent to either the one-side extendible/contractible leg or the opposite-side extendible/contractible leg, with an elastically deformable operation portion that is adapted to be pushed for operation by the unlocking element of the extendible/contractible leg that is adjacent thereto and thereby elastically deformed so as to move the restriction element of the middle extendible/contractible leg.

According to the examples, as the leg device has such a structure that gripping all of the at least three extendible/contractible legs together causes the at least three extendible/contractible legs to simultaneously shift from a locked state to an unlocked state, it is possible to simultaneously release the at least three extendible/contractible legs from the locked state with a single action.

According to other examples, the leg device has such a structure that gripping all of the at least three extendible/contractible legs together causes the restriction elements of the at least three extendible/contractible legs to simultaneously overcome the biasing force of the biasing elements and move from a position where the restriction elements are capable of engaging with the female engagement portions to a position where the restriction elements not engage with the female engagement portions. Therefore, by moving the at least three restriction elements, it is possible to simultaneously release the at least three extendible/contractible legs from the locked state appropriately with a single action.

Further, by gripping the middle extendible/contractible leg, the one-side extendible/contractible leg, and the opposite-side extendible/contractible leg together, it is possible to unfailingly release these middle extendible/contractible leg, one-side extendible/contractible leg, and opposite-side extendible/contractible leg from the locked state with a single action.

DETAILED DESCRIPTION

Figure 1:
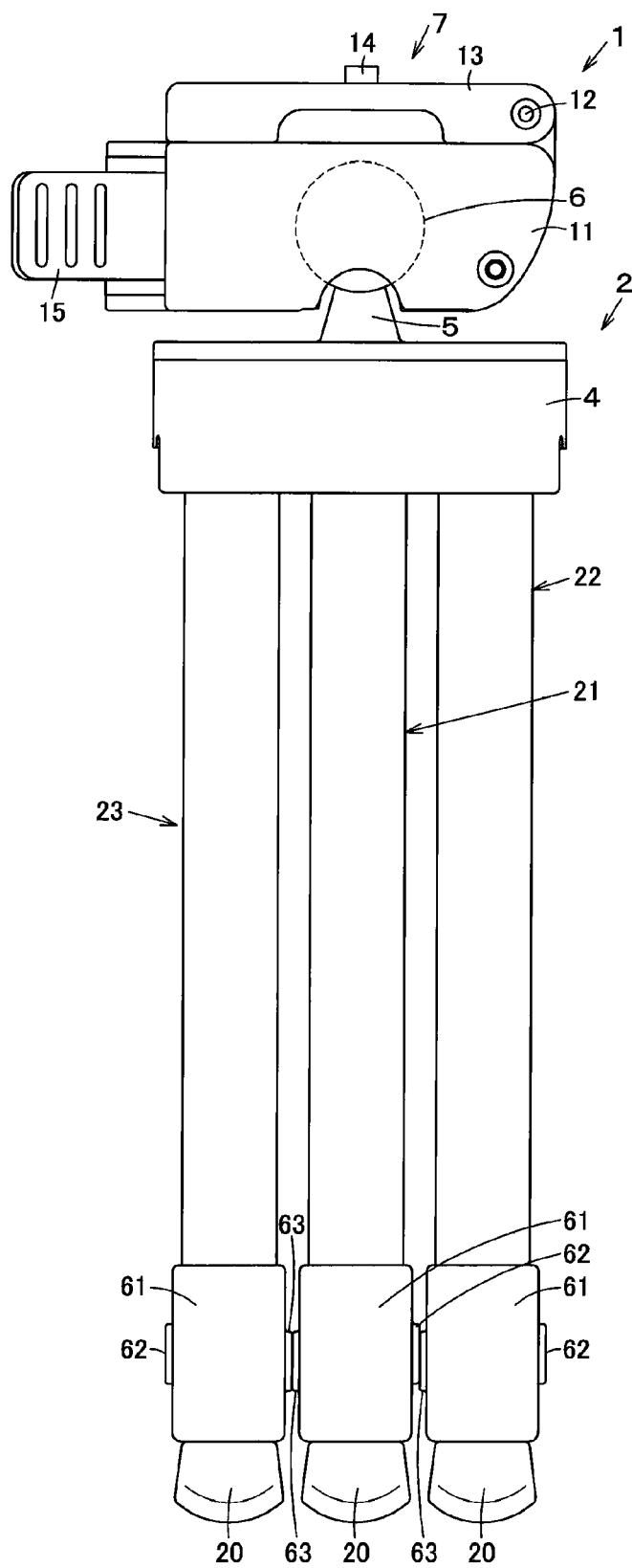
FIG. 1 is a front view of a tripod according to an embodiment of the present invention, showing the state when the tripod is not in use.
Figure 2:
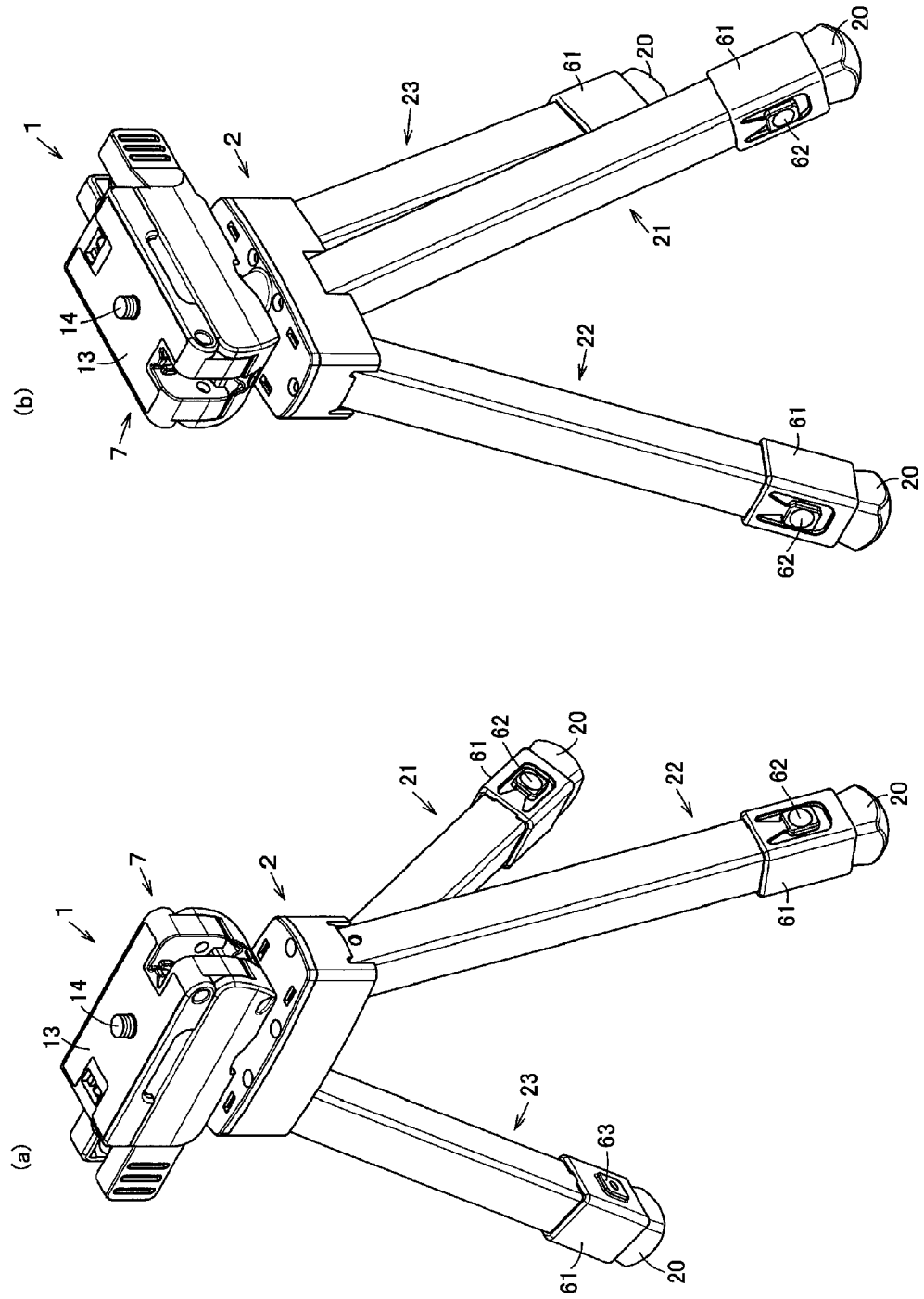
FIG. 2(a) and FIG. 2(b) are perspective views of the aforementioned tripod when in use.

A leg device according to an example of the present invention is explained hereunder, referring to drawings. Referring to FIGS. 1 and 2, numeral 1 denotes a leg device that is a tripod (a tripod with a tripod head). The tripod 1 is provided with a base 2.

The base 2 has a leg attaching portion 4, which is slightly longer in the lateral direction, a column portion 5, and a generally spherical tripod head attaching portion 6. The tripod head attaching portion 6 is attached through the column portion 5 to the upper end face of the leg attaching portion 4.

Rotatably attached to the tripod head attaching portion 6 of the base 2 is a tripod head 7 for supporting an object to be supported (not shown), such as a camera or a video camera, that is removably attached to the tripod head 1. She tripod head 7 has a tripod head body portion 11 and a supporting plate portion 13, which is attached to the tripod head body portion 11 in such a manner as to be capable of pivoting around the shaft 12 extending in the fore-and-aft direction. A threaded portion 14 to be screwed in a threaded hole formed in the lower end face of an object to be supported projects upward the upper end face of the supporting plate portion 13. The tripod head body portion 11 is provided with an operation means 15 for releasing the tripod head 7 from a locked state with respect to the tripod head attaching portion 6.

Three elongated extendible/contractible legs 21, 22, 23, which can be extended and contracted in the longitudinal direction, are pivotally attached to the leg attaching portion 4 of the base 2. To be more specific, one of the extendible/contractible legs, i.e. a middle extendible/contractible leg 21, is attached to the midpoint in the lateral direction of the leg attaching portion 4 and is capable of pivoting in the fore-and-aft direction. Another extendible/contractible leg, i.e. a one-side extendible/contractible leg 22, is laterally pivotally attached to one lateral side (the right-hand side as viewed from the front) of the leg attaching portion 4, and yet another extendible/contractible leg, i.e. an opposite-side extendible/contractible leg 23, is laterally pivotally attached to the opposite lateral side (the left-hand side as viewed from the front) of the leg attaching portion 4.

As shown in FIG. 1, when the tripod 1 is not in use, the three extendible/contractible legs 21, 22, are arranged side by side on the same plane and parallel with one another. To be more specific, the one-side extendible/contractible leg 22 is positioned adjacent to one side of the middle extendible/contractible leg 21, and the opposite-side extendible/contractible leg 23 is positioned adjacent to the opposite side of the middle extendible/contractible leg 21. As shown in FIG. 2, when the tripod 1 is in use the three extendible/contractible legs 21, 22, 23 extend along the respective oblique lines of an imaginary pyramid in the shape of a generally triangular pyramid.

As the middle extendible/contractible leg 21 and the one-side extendible/contractible leg 22 have an identical structure, and the middle extendible/contractible lea 21 and the opposite-side extendible/contractible leg 23 have structures that are bilaterally symmetric with each other, the structures of the extendible/contractible legs are explained hereunder, primarily focusing on the middle extendible/contractible leg 21.

Figure 3:
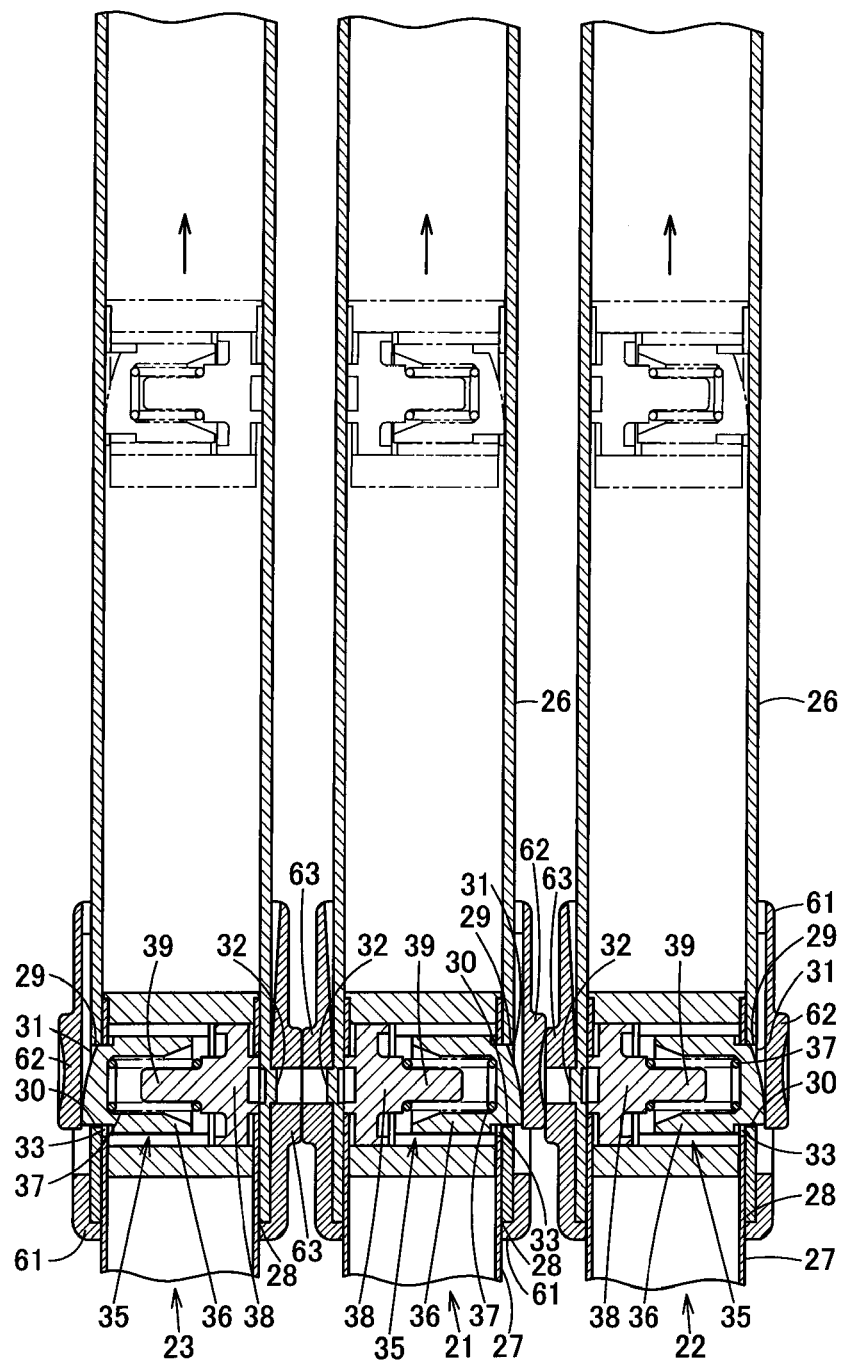
FIG. 3 is a sectional view of extendible/contractible legs of the tripod in a locked state.
Figure 4:
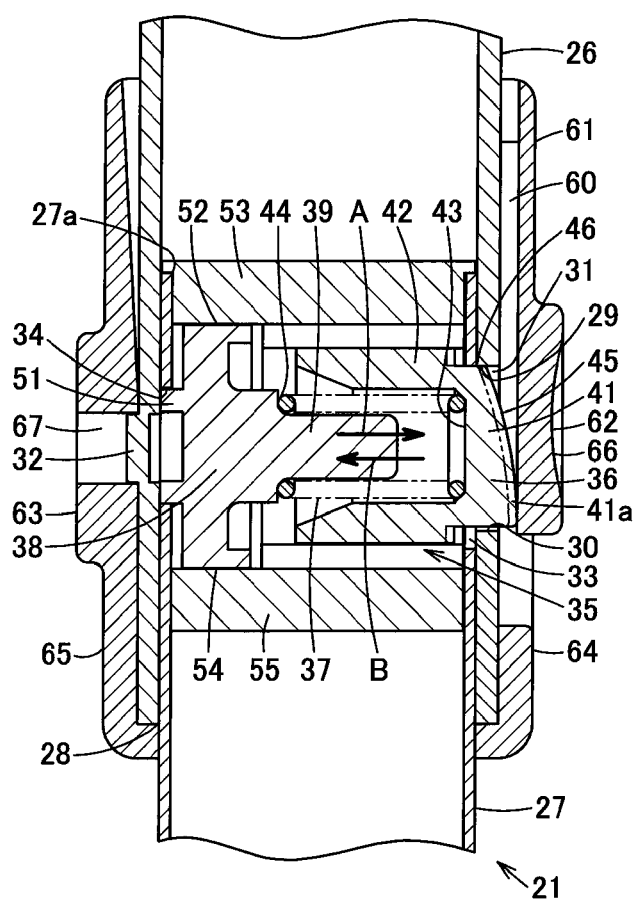
FIG. 4 is an enlarged sectional view of one of the aforementioned extendible/contractible legs in the locked state.

The middle extendible/contractible leg 21 has a multistage structure, for example a two-stage structure. As shown in FIGS. 3 and 4, the middle extendible/contractible leg 21 has two pipe-shaped bodies 26, 27 that are long in the vertical direction and have a polygonal pipe-like shape, which, in the case of the present embodiment, a generally rectangular pipe-like shape. To be more specific, the middle extendible/contractible leg 21 has a first pipe-shaped body (upper pipe) 26, the upper end portion of which is pivotally attached through a connecting member (not shown) to the leg attaching portion 4 of the base 2, and a second pipe-shaped body (lower pipe) 27, which is snugly inserted in the first pipe-shaped body 26 in such a manner as to be capable of moving (sliding) in the axially directions, in other words in the contracting direction (upward) and the extending direction (downward). The second pipe-shaped body 27 projects downward from a lower end opening 28 at the bottom of the first pipe-shaped body 26.

A hole portion, i.e. an outer hole portion 31, is formed at, one side of the lower end portion of the first pipe-shaped body 26, and a protruding portion 32 that protrudes outward is formed at the opposite side of the lower end portion of the first pipe-shaped body 26. The first pipe-shaped body 26 also an upper-side female engagement portion (a female engagement portion) 29 and a lower-side female engagement portion 30, both of which are formed at a portion facing the outer hole portion 31.

Formed at one side of the upper end portion of the second pipe-shaped body 27 is an inner hole portion 33, which is a hole portion provided so as to face the outer hole portion 31 when the middle extendible/contractible leg is extended to the maximum length. The second pipe-shaped body 27 also has, at the opposite side of the upper end portion thereof, a mounting hole portion 34. Furthermore, a ferrule member 20 is attached to the bottom of the second pipe-shaped body 27.

A restriction means 35 is provided in the upper end portion, of the second pipe-shaped body 27 and serves as a lock means to prevent extension/contraction movement of the middle extendible/contractible leg 21 when the middle extendible/contractible leg 21 is in the locked state, and permits extension/contraction movement of the middle extendible/contractible 21 when the middle extendible/contractible leg 21 is in an unlocked state.

The restriction means 35 has a movable restriction element 36, which may be a dowel or the like. When the middle extendible/contractible leg 21 is in the locked state, engagement of the restriction element 36 with the female engagement portions 29, 30 prevents vertical movement of the second pipe-shaped body 27 with respect to the first pipe-shaped body 26. When the middle extendible/contractible leg 21 is in the unlocked state, the restriction element 36 does not engage the female engagement portions 29, 30 so that the second pipe-shaped body 27 can be vertically moved with respect to the first pipe-shaped body 26.

At least a part of the restriction element 36 is located inside the upper end portion of the second pipe-shared body 27 so that the restriction element 36 is capable of moving in directions perpendicular to the axial direction of the second pipe-shaped body 27, i.e. a protruding direction A and a reverse direction B, which is the direction opposite that of the protruding direction A.

The restriction means 35 also has an elastically deformable biasing element 37 and a supporting element 33. The biasing element 37 may be a compression coil spring or the like and serves to bias the restriction element 36 in the protruding direction A pin-shaped supporting portion 39 for supporting the biasing element 37 is formed on the supporting element 38. The biasing element 37 is positioned in a compressed state between the restriction element 36 and the supporting element 38.

The restriction element 36 is provided at the distal end thereof with a restriction portion 41 for engaging the female engagement portions 29, 30, and is also provided at the base end thereof with a cylindrical portion 42 in the shape of a hollow cylinder. The biasing element 37 is housed in the cylindrical portion 42, with an end of the biasing element 37 in contact with a receiving face 43 of the restriction element 36 and the opposite end of the biasing element 37 in contact with a receiving face 44 of the supporting element 38. A pushing-force receiving surface 45 is formed on the distal end face of the restriction portion 41. The pushing-force receiving surface 45 is formed as a slanted surface inclined with respect to the axial direction and extends from the top to the bottom of the distal end face of the restriction portion 41 so that, when the second pipe-shaped body 27 moves downward with respect to the first pipe-shaped body 26, the pushing-force receiving surface 45 moves in conjunction with the downward movement of the second pipe-shaped body 27 with respect to the first pipe-shaped body 26, and gradually enters the outer hole portion 31 of the first pipe-shaped body 26. At that time, the pushing-force receiving surface 45 starts to enter the outer hole portion 31 before the entire outer hole portion 31 faces the inner hole portion 33.

When the middle extendible/contractible leg 21 is extended to the maximum length, the restriction element 36 is moved in the protruding direction A by the biasing force of the biasing element 37 and protrudes out of the second pipe-shaped body 27 from the inner hole portion 33, entering the outer hole portion 31 of the first pipe-shaped body 26. The restriction portion 41 of the restriction element 36, which has entered the outer hole portion 31, engages with the female engagement portions 29, 30 of the second pipe-shaped body 27, thereby restricting vertical movement of the second pipe-shaped body 27 with respect to the first pipe-shaped body 26. In other words, as a result of the restriction element 36 going into the outer hole portion 31 and reaching a locking position, at which the restriction element 36 is capable of engaging with the upper female engagement portion 29 and the lower female engagement portion 30, the middle extendible/contractible leg 21 comes into the locked state. At that time, a part of the restriction portion 41 protrudes out of the first pipe-shaped body 26 from the outer hole portion 31. This part is referred to as a protruding portion 41a. When the middle extendible/contractible leg 21 is in the contracted state (at the minimum length), the restriction element 36 is inside the pipe-shaped body 27 instead of protruding therefrom, and the distal end face of the restriction portion 41 is in contact with the inner surface of the first pipe-shaped body 26.

As shown in FIG. 4, the supporting element 38 has a mounting portion 51 so that the supporting element 38 is attached to the second pipe-shaped body 27 by fitting the mounting portion 51 in the mounting hole portion 34 of the second pipe-shaped body 27. The supporting element 33 also has an upper receiving face 52, which is formed on the upper end face of the supporting element 38. An upper plate member 53 that is attached to the upper end of the second pipe-shaped body 27 and thereby closes off an upper end opening 27a at the upper end of the second pipe-shaped body 27 is in contact with the upper receiving face 52. Furthermore, the supporting element 38 also has a lower receiving face 54, which is formed on the lower end face of the supporting element 38. A lower plate member 55 attached to the proximity of the upper end of the second pipe-shaped body 27 is in contact with the lower receiving face 54. The restriction means 35 is contained in the space between the upper plate member 53 and the lower plate member 55, which are arranged one above the other.

The middle extendible/contractible leg 21 has an unlocking element 61, which has a generally rectangular collar-like shape and is fitted around the outer circumferential surface of the lower end portion of the first pipe-shaped body 26. The unlocking element 61 is provided at one side thereof with an elastically deformable plate-shaped operation portion 62, and at the opposite side thereof with a protruding portion 63, which protrudes outward and serves as a pushing portion. In other words, the operation portion 62 is provided as an integral body with the upper end portion of a one-side plate portion 64 of the unlocking element 61 in such a manner that, by means of elastic deformation, the operation portion 62 swings at the upper end thereof, and a gap 60 with a dimension corresponding to that of the protruding portion 41a is provided between the outer surface of the first pipe-shaped body 26 and the operation portion 62 before elastic deformation. Furthermore, a protruding portion 63 is formed at the approximate center of an opposite-side plate portion 65 of the unlocking element 61 as an integral body with the opposite-side plate portion 65 and protrudes outward.

When the middle extendible/contractible leg 21 is in the extended state, the operation portion 62 faces the restriction element 36 so that the protruding portion 41a of the restriction element 36 is in contact with the inner surface of the operation portion 62. An indented portion 66 is formed in the outer surface of the operation portion 62.

A through hole portion 67 is formed through the opposite-side plate portion 65 at such a location as to pass through the protruding portion 63, and the protruding portion 32 of the first pipe-shaped body 26 is fitted in the through hole portion 67. As a result of the fitting of the protruding portion 32, the unlocking element 61 is securely positioned with respect to the first pipe-shaped body 26.

As shown by two-dot chain line in FIG. 4, when the middle extendible/contractible leg 21 is in the locked state, pushing the operation portion 62 elastically deforms the operation portion 62, which consequently pushes the restriction element 36. As a result, overcoming the biasing force of the biasing element 37, the restriction element 36 moves in the reverse direction. B, from the position where the restriction element 36 is capable of engaging with the upper female engagement portion 29 of the first pipe-shaped body 26 to a position where the restriction element 35 does not engage with the upper female engagement portion 29. In other words, as a result of the restriction element 36 being moved in the reverse direction B by the elastic deformation of the operation portion 62 to an unlocking position, i.e. a position at which an engagement face 46 of the restriction element 36 is not in engagement with the upper female engagement portion 29, the middle extendible/contractible leg 21 shifts from the locked state to the unlocked state.

Figure 5:
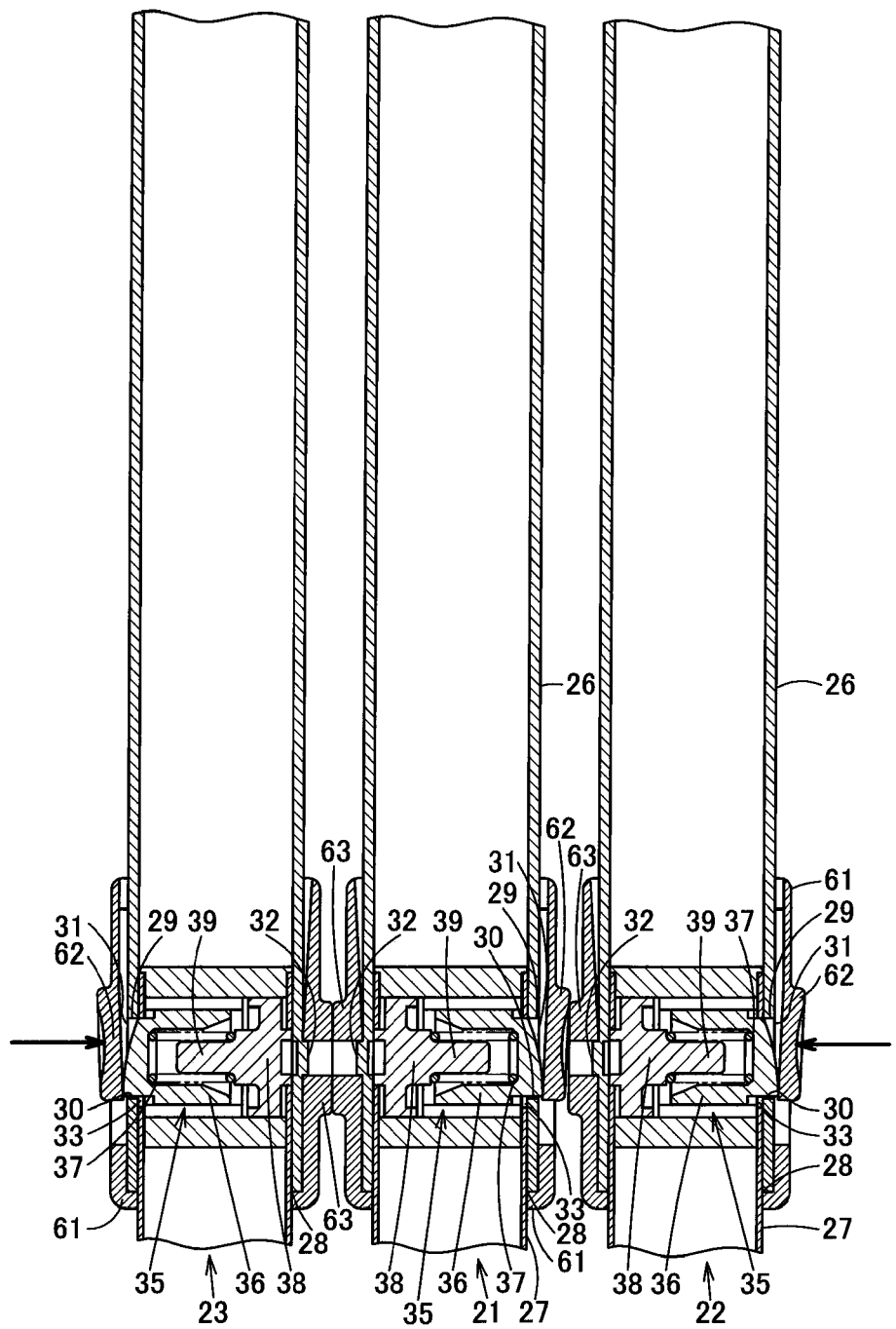
FIG. 5 is a sectional view of the extendible/contractible legs in an unlocked state.

As shown in FIG. 5, the operation portion 62 of the unlocking element 61 of the one-side extendible/contractible leg 22 is provided at the side facing away from the middle extendible/contractible leg 21. The operation portion 62 is elastically deformable so that, when being pushed by a finger, for example the index finger of one hand, of a user, the operation portion 62 is elastically deformed and thereby moves the restriction element 36 of the one-side extendible/contractible leg 22 in the reverse direction B until the restriction element 36 reaches the unlocking position.

The operation portion 62 of the unlocking element 61 of the opposite-side extendible/contractible leg 23 is provided at the side facing away from the middle extendible/contractible leg 21. The operation portion 62 is elastically deformable so that, when being pushed by another finger, for example the thumb of the aforementioned one hand, of the user, the operation portion 62 is elastically deformed and thereby moves the restriction element 36 of the opposite-side extendible/contractible leg 23 in the reverse direction B until the restriction element 36 reaches the unlocking position.

Furthermore, the operation portion 62 of the unlocking element 61 of the middle extendible/contractible leg 21 is provided at the side facing either the one-side extendible/contractible leg 22 or the opposite-side extendible/contractible leg 23 (for example, the one-side extendible/contractible leg 22). The operation portion 62 of the middle extendible/contractible leg 21 is elastically deformable so that, when being pushed by the protruding portion 63 of the unlocking element 61 of the one-side extendible/contractible leg 22, the operation portion 62 of the middle extendible/contractible leg 21 is elastically deformed and thereby moves the restriction element 36 of the middle extendible/contractible leg 21 in the reverse direction B until, the restriction element 36 reaches the unlocking position.

With the structure as above, by gripping all the three extendible/contractible legs 21, 22, 23 with one hand, the user can simultaneously bring the extendible/contractible legs 21, 22, 23 into the unlocked state. In this state, it is possible to contract all the three extendible/contractible legs 21, 22, 23 simultaneously, while holding the three ferrule members 20.

Next, how the tripod 1 is operated and other details are explained.

When extending the three extendible/contractible legs 21, 22, 23 to use the tripod 1, a user (operator) holds the ferrule members of the three extendible/contractible legs 21, 22, 23, which are in the contracted state as shown in FIG. 1, and pull the three second pipe-shaped bodies 27 from inside the respective first pipe-shaped bodies 26.

As the three extendible/contractible legs 21, 22, 23 are brought into the extended state shown in FIG. 3, the restriction element 35 of each extendible/contractible leg 21, 22, 23 is moved in the protruding direction A thereof by the biasing force of the corresponding biasing element 37, enters the outer hole portion 31 of the first pipe-shaped body 26, and reaches the position at which the restriction element 36 is capable of engaging with the upper female engagement portion 29 and the lower female engagement portion 30. As a result, each extendible/contractible leg 21, 22, 23 is brought into the locked state, with the second pipe-shaped body 27 thereof being prevent from moving with respect to the first pipe shaped body 26.

Next, by pivoting the extendible/contractible legs 21, 22, 23 with respect to the base 2 to make the tripod 1 ready to use, in other words into a state for example, shown in FIG. 2. Then, the tripod 1 is used with an object to be supported, such as a camera, attached to the tripod head 7.

Figure 8:
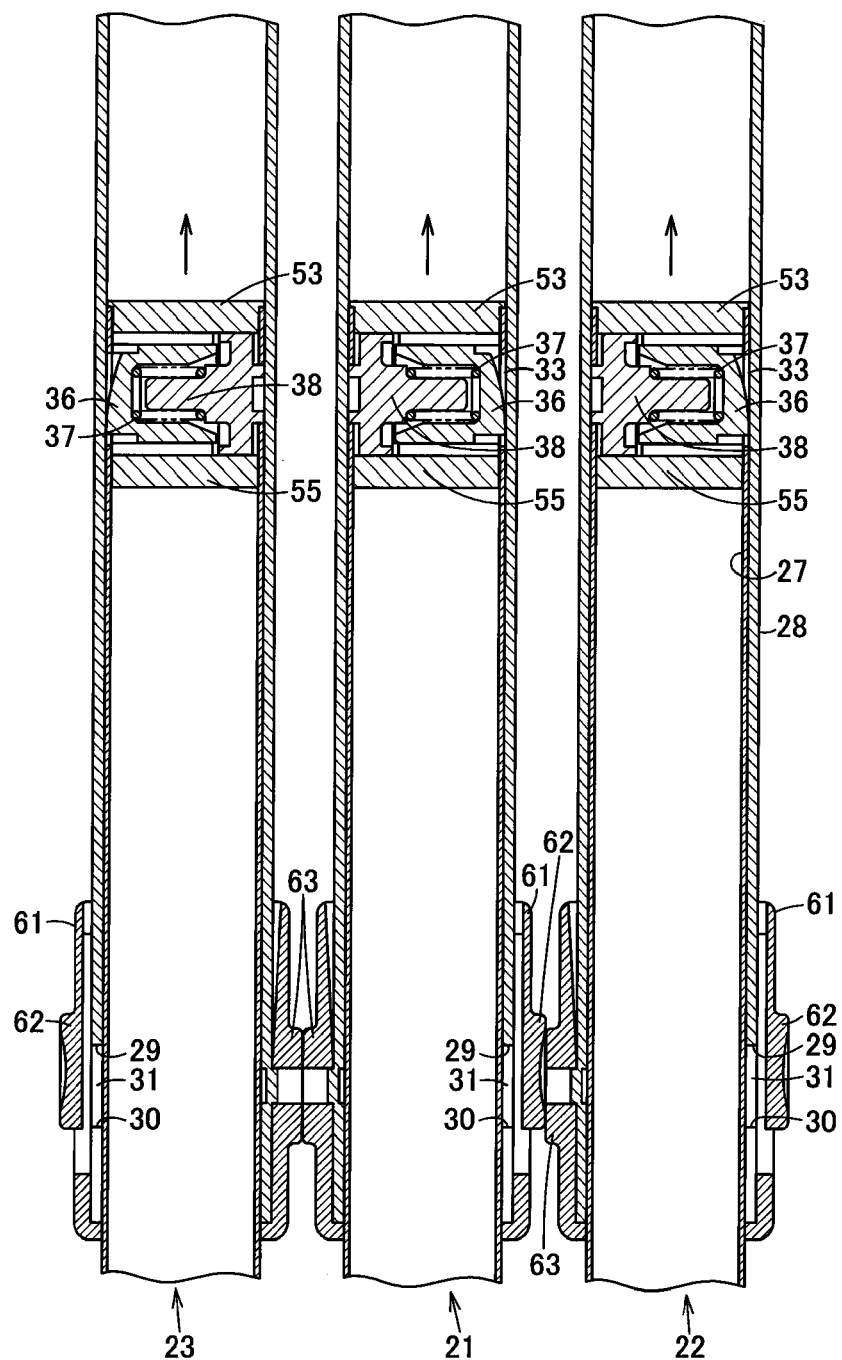
FIG. 8 is a sectional view of the extendible/contractible legs partway through the contracting movement.

On the other hand, when contracting toe three extendible/contractible legs 21, 22, 23 after using the tripod 1, the user simultaneously unlocks all the three extendible/contractible legs 21, 22, 23, which are arranged side by side on the same plane as shown in FIG. 5, by holding the extendible/contractible legs 21, 22, 23 together in such a manner as to clasp them with one hand, applying a force from both lateral sides. Then, holding the three ferrule members 20, the user pushes the three second pipe-shaped bodies 27 respectively into the first pipe-shaped bodies 26 (See FIG. 8).

Figure 6:
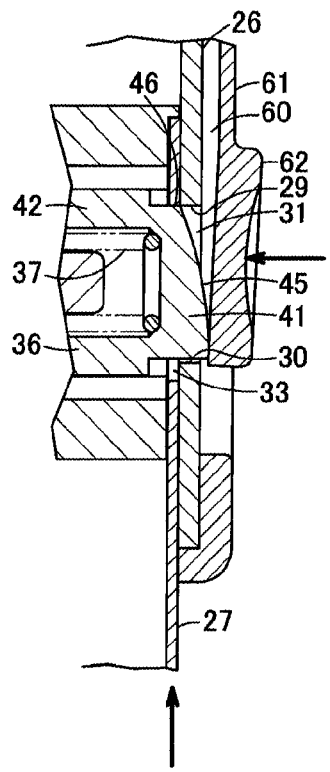
FIG. 6 is a sectional view showing how a restriction element of the extendible/contractible leg is moved.

As shown in FIG. 6, when an operation portion 62 is pushed, the operation portion 62 is elastically deformed and, as a result, pushes the restriction element 36. The operation portion 62 of the middle extendible/contractible leg 21 is not operated directly by a user, but pushed by the protruding portion 63 of the unlocking element 61 of the one-side extendible/contractible leg 22. At that time, the protruding portion 63 of the middle extendible/contractible leg 21 comes into contact with the protruding portion 63 of the opposite-side extendible/contractible leg 23, which faces the protruding portion 63 of the middle extendible/contractible leg 21.

When the restriction element 36 is pushed, restriction element 36 moves, overcoming the biasing force of the biasing element 37, in the reverse direction B, from the position at which the engagement face 46 which is disposed on the upper side is capable of engaging with the upper female engagement portion 29 to the position at which the engagement face 46 does not engage with the upper female engagement portion 29. As a result, the engagement face 46 of the restriction element 36 moves away from the position at which the engagement face 46 faces the upper female engagement portion 29 and goes into the inner hole portion 33 of the second pipe-shaped body 27, thereby bringing the two pipe-shaped bodies into the unlocked state so that the second pipe-shaped body 27 is permitted to move only in the contract direction with respect to the first pipe-shaped body 26.

Figure 7:
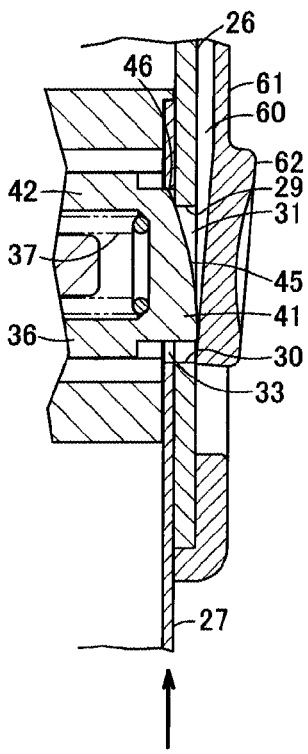
FIG. 7 is a sectional view showing movement of the restriction element of the extendible/contractible leg subsequent to the movement shown in FIG. 6.

Moving the second pipe-shaped body 27 upward with respect to the first pipe-shaped body 26 in this state causes the pushing-force receiving surface 45 of the restriction portion 41 of the restriction element 36 to be pushed by the upper female engagement portion 29 as shown in FIG. 7 so that the restriction element 36 overcomes the biasing force of the biasing element 37 and moves further in the reverse direction B. As a result, the restriction element 36 exits the outer hole portion 31.

After thus simultaneously unlocking the three extendible/contractible legs 21, 22, 23 arranged in such a manner that the respective restriction elements 36 thereof are aligned on a straight line, the user moves the three second pipe-shaped bodes 27 upward with respect to the first pipe-shaped bodies 26 to bring the three extendible/contractible legs 21, 22, 23 into the initial contracted state shown in FIG. 1.

As simultaneously gripping the three extendible/contractible legs 21, 22, 23 in the locked and extended state, in which they are restricted from being extendible/contractible legs 21, 22, 23 in the extended state simultaneously to shift from the locked state to the unlocked state, in which only contracting movement is possible, it is possible to simultaneously release the three extendible/contractible legs 21, 22, 23 from the locked state with a single action. Therefore, compared with conventional structures, the tripod 1 is much more convenient to operate.

Although the invention is explained referring to the above example, in which three extendible/contractible legs 21, 22, 23 are provided, the invention is applicable to a structure that is provided with at least three extendible/contractible legs 21, 22, 23; for example, four or more extendible/contractible legs may be provided.

The invention is not limited to structures in which three extendible/contractible legs 21, 22, 23 are arranged on the same plane; the invention is also applicable to, for example, a structure in which three extendible/contractible legs are respectively positioned at the vertices of an imaginary triangle as viewed from the top.

Furthermore, the extendible/contractible leas 21, 22, 23 are not limited to a two-stage structure, and they may have a desired number of stages. For example, the extendible/contractible legs 21, 22, 23 may have a three-stage structure, such as the one disclosed in JP '214, or a four or more-stage structure.

The application of the invention is not limited to a tripod for supporting a camera or the like; the invention is also applicable to other stands or similar devices.

Other examples of the structure of a leg device according to the invention include a structure wherein simultaneously gripping at least three extendible/contractible legs in the locked and contracted state, in which they are restricted from being extended or contracted, causes the at least three extendible/contractible legs in the contracted state simultaneously to shift from the locked state to the unlocked state, in which only extension movement is possible; and another structure wherein gripping at least three extendible/contractible legs in the locked state, in which they are restricted from being extended or contracted, causes the at least three extendible/contractible legs simultaneously to shift from the locked state to the unlocked state, in which extension and contraction movement is possible.

The invention is applicable to, for example, a tripod that includes three extendible/contractible legs that can be extended and contracted.

The invention claimed is:

1. A leg device comprising:
    a base; and
    at least three extendible and contractible legs that are provided at the base in such a manner as to be capable of being extended and contracted, wherein:
    the leg device is configured such that gripping all of the at least three extendible and contractible legs together causes the at least three extendible and contractible legs to simultaneously shift from a locked state to an unlocked state,
    each one of the at least three extendible and contractible legs comprises:
        a first pipe-shaped body having a female engagement portion;
        a second pipe-shaped body movably inserted in the first pipe-shaped body;
        a restriction element that is provided so that, when the at least three extendible and contractible legs are in the locked state, engagement of the restriction element with the female engagement portion prevents movement with respect to the first pipe-shaped body of the second pipe-shaped body and that, when the at least three extendible and contractible legs are in the unlocked state, the restriction element does not engage with the female engagement portion, thereby enabling movement with respect to the first pipe-shaped body of the second pipe-shaped body; and
        a biasing element for applying a biasing force to the restriction element,
    when the at least three extendible and contractible legs are in a folded state, the at least three legs are on a same plane,
    the leg device is configured such that gripping all of the at least three extendible and contractible legs arranged side by side on a same plane together to clasp them from both lateral sides causes restriction elements of the at least three extendible and contractible legs to simultaneously overcome the biasing force of biasing elements and to move from a position where the restriction elements are capable of engaging with female engagement portions to a position where the restriction elements do not engage with the female engagement portions,
    the at least three extendible and contractible legs are composed of a middle extendible/contractible extendible and contractible leg, a one-side extendible and contractible leg, and an opposite-side extendible and contractible leg,
    the one-side extendible and contractible leg and the opposite-side extendible and contractible leg pivotally moves in a first direction while the middle extendible and contractible leg moves in a second direction perpendicular to the first direction,
    the middle extendible and contractible leg, the one-side extendible and contractible leg and the opposite-side extendible and contractible leg are respectively provided with unlocking elements, each of which has a polygonal pipe-like shape and is attached to and covers a corresponding outer peripheral side of an lower end portion of the first pipe-shaped body,
    an unlocking element of the one-side extendible and contractible leg is provided, at a side facing away from the middle extendible and contractible leg, with an elastically deformable operation portion that is configured to be pushed for operation by a user and thereby elastically deformed so as to move the restriction element of the one-side extendible and contractible leg, and with a convex portion which is a pushing portion protruding toward outside at the side facing away from the middle extendible and contractible leg,
    an unlocking element of the opposite-side extendible and contractible leg is provided, at a side facing away from the middle extendible and contractible leg, with an elastically deformable operation portion that is configured to be pushed for operation by the user and thereby elastically deformed so as to move the restriction element of the opposite-side extendible and contractible leg, and with the convex portion which is the pushing portion protruding toward outside at the side facing away from the middle extendible and contractible leg,
    an unlocking element of the middle extendible and contractible leg is provided, at a side adjacent to one of the one-side extendible and contractible leg and the opposite-side extendible and contractible leg, with an elastically deformable operation portion that is configured to be pushed for operation by the pushing portion of the unlocking element of the one of the one-side extendible and contractible leg and the opposite-side extendible and contractible leg and thereby elastically deformed so as to move the restriction element of the middle extendible and contractible leg, and at the side adjacent to the one of the one-side extendible and contractible leg and the opposite-side extendible and contractible leg, with the convex portion which is the pushing portion protruding toward outside coming into contact with the pushing portion of the unlocking element of another of the one-side extendible and contractible leg and the opposite-side extendible and contractible leg, and the elastically deformable operation portions of the respective unlocking elements of the middle extendible and contractible leg, the one-side extendible and contractible leg and the opposite-side extendible and contractible leg are an elastically deformable plate and configured to move the regulating member rotating mainly around the upper side by elastic deformation.

* * * * *

UNITED STATES PATENT AND TRADEMARK OFFICE
CERTIFICATE OF CORRECTION

| | | |
|---|---|---|
| PATENT NO. | : 8,915,476 B2 | Page 1 of 1 |
| APPLICATION NO. | : 13/375651 | |
| DATED | : December 23, 2014 | |
| INVENTOR(S) | : Koichiro Nakatani | |

It is certified that error appears in the above-identified patent and that said Letters Patent is hereby corrected as shown below:

On the title page

In the Abstract item (57):

Line 7, delete "kg" and insert --leg--

Line 11, delete "kg" and insert --leg--

Signed and Sealed this
Twelfth Day of May, 2015

Michelle K. Lee
*Director of the United States Patent and Trademark Office*